United States Patent Office 2,809,198
Patented Oct. 8, 1957

2,809,198

TETRADEHYDRODESERPIDIC ACID COMPOUNDS

Charles Ferdinand Huebner, Chatham, N. J., assignor to Ciba Pharmaceutical Products, Inc., Summit, N. J., a corporation of New Jersey No Drawing. Application January 12, 1955,
Serial No. 481,493

12 Claims. (Cl. 260—286)

This invention is for new quaternary ammonium compounds related to deserpidic acid and the process for the preparation thereof.

According to my investigations deserpidic acid or esters thereof, which are described in copending application Serial No. 471,519, filed November 26, 1954, of Paul R. Ulshafer, give on treatment with certain dehydrogenating agents disclosed below a new acid or the corresponding esters which contain a quaternary nitrogen atom and four hydrogen atoms less than the starting materials. To the new acid I have therefore assigned the name tetradehydrodeserpidic acid. In accordance with my investigation tetradehydrodeserpidic acid can be given the formula:

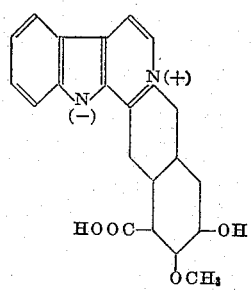

and deserpidic acid the formula:

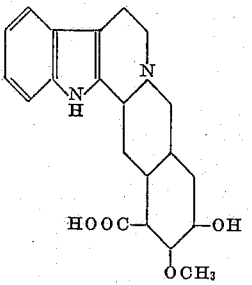

In these formulae R stands for the tetravalent organic residue $C_9H_{14}O$, bound in deserpidic acid to the above indicated tetrahydro-pyridoindole ring system and the free hydroxyl and carboxyl group of deserpidic acid.

Thus my invention relates to tetradehydrodeserpidic acid and the esters thereof in which at least one of the two ester-forming groups is esterified; it comprises more especially those esters in which the carboxyl group is esterified with an aliphatic alcohol, for example an alkanol, and the hydroxyl group is esterified with an aliphatic, araliphatic, aromatic or heterocyclic carboxylic acid.

The invention relates most particularly to tetradehydrodeserpidine of the formula:

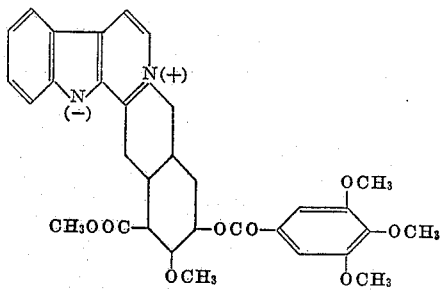

and its quarternary salts, which are represented by the formula:

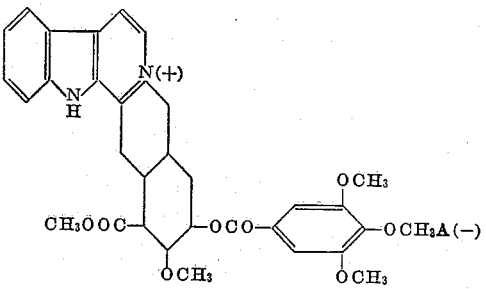

wherein A stands for an anion.

The new compounds have valuable properties. Thus they absorb U. V. light of wave length between 290 and 320 m$\mu$ and can thus be used for the prevention of sunburn as active ingredients in sun screens. Especially valuable in this respect is tetradehydrodeserpidine and its salts. The absorption spectrum of tetradehydrodeserpidine hydrochloride taken in ethanol shows the following maximum in the above mentioned region of the U. V. light: $\lambda=307$ m$\mu$ ($\epsilon=12514$). The new compounds are also valuable as intermediates for the synthesis of compounds having related structure, which can be used as medicaments.

The process for the manufacture of the new compounds comprises dehydrogenating deserpidic acid or its esters by treating them with dehydrogenating agents capable of transforming compounds having the yohimbine ring structure into the corresponding py-tetradehydro-compounds, for example yohimbine into py-tetradehydro-yohimbine. Such agents are especially lead tetraacylates, such as lead tetraacetate, lead dioxide into acetic acid or maleic acid in the presence of palladium black, or furthermore oxygen in acetic acid in the presence of a platinum catalyst, and more generally oxidation agents having a potential of about $-1.7$ volts or higher and being otherwise appropriate for the dehydrogenation of the above mentioned compounds. The preferred method consists of using lead tetraacetate in acetic acid, and it is of advantage to avoid an excess of the oxidizing agent.

Depending on the working conditions employed, the new compounds are obtained in the form of the free anhydronium bases or the quaternary salts. From the salts the free bases can be obtained in the usual manner; the anhydronium bases can be converted into their salts, for example those with organic or inorganic acids, such as hydrohalic acids, sulfuric acid, phosphoric acid, nitric acid, hydroxyethane sulfonic acid, toluene sulfonic acid, acetic acid, tartaric acid or citric acid and the like, for example by treating the bases with the corresponding acids. Esters obtained can be converted by hydrolysis, preferably under basic conditions into the corresponding partially or completely hydrolyzed compounds, for example tetradehydrodeserpidic acid esters having a free hydroxyl group or tetradehydrodeserpidic acid. The free acid may be converted into its esters having a free hydroxyl group by treating it with an esterifying agent capable of converting carboxyl group into an esterified carboxyl group. To this end the acid can be converted into an ester thereof directly or by way of a functional derivative thereof. Advantageously the acid is reacted with a diazoalkane, or it is esterified with an alcohol, especially an alkanol in the presence of a strong acid such as a hydrohalic acid. To convert tetradehydrodeserpidic acid into an ester thereof in which both functional groups are esterified, an ester thereof with a free hydroxyl group is treated with an esterifying agent capable of converting a hydroxyl group into an esterified hydroxyl group. One procedure is to react the ester with a free hydroxyl group with the desired acid advantageously in the form of a reactive functional derivative thereof, especially an acyl halide, such as for example the acyl chloride or anhydride. The reaction is advantageously conducted in the presence of a diluent and/or a condensing agent. When an acid halide is used it is advantageous to work in an anhydrous solvent in the presence of an acid-binding agent such as an alkali carbonate or alkaline earth carbonate or a strong organic base such as a tertiary amine. There may be used, e. g. an acid halide in pyridine as a solvent.

The invention also embraces a process, wherein the starting materials are used in the form of their salts and/or the final products are obtained in the form of their salts, and furthermore any modification thereof, wherein a compound obtainable as an intermediate in any stage of the process of the invention is used as starting material and the remaining steps are carried out.

The new compounds, especially tetradehydrodeserpidine and its salts, can be made up into sun screen compositions according to the customary methods employed in making such preparations. Prefereably they may be incorporated into a hydrophilic ointment which contains, for example, glycols such as propylene glycol, higher aliphatic alcohols such as stearyl alcohol, white petrolatum, distilled water and the like. More conveniently, the new compounds are used in the form of their salts such tetradehydrodeserpidine hydrochloride, which can also be used in the form of applicable solutions, for example in 70 percent alcohol. The mentioned sun screen compositions have preferably a content of 3–5 percent of the new active compounds.

The following example will serve to illustrate the invention, the relationship of parts by weight to parts by volume being the same as the gram to the milliliter, and the temperatures being given in degrees centigrade.

*Example*

To a well stirred solution of 5 parts by weight of deserpidine containing 2 moles of acetone of crystallization in 130 parts by volume of acetic acid held at 40° with external heating is slowly added 250 parts by volume of a 0.063 M solution of lead tetraacetate in acetic acid. The addition is at such a rate that the oxidant is never in large excess. Upon completion of the reaction, the lead tetraacetate is completely consumed. 90 percent of the acetic acid is removed by distillation in vacuo. 50 parts by volume of water is added followed by 500 parts by volume of chloroform. A 50 percent solution of sodium hydroxide in water is added till the aqueous phase is just basic (pH 9–10). The chloroform phase is separated and washed with water. Enough 8 N ethanolic hydrogen chloride is added to the chloroform solution to bring the pH to 3. The chloroform solution is then concentrated to dryness in vacuo. The residue of the crude tetradehydro compound is dissolved in 200 parts by volume of boiling water and filtered hot from a small amount of tarry by-products. 20 parts by volume of 6 N hydrochloric acid is added and on cooling short needles of tertadehydrodeserpidine hydrochloride separate. Tetradehydrodeserpidine hydrochloride may be recrystallized from hot water containing a small amount of excess hydrochloric acid. It melts at 200° with decomposition. Its U. V.-spectrum, taken in ethanol, shows in the region between 290 and 3 20 m$\mu$ the following maximum: $\lambda = 307$ m$\mu$ ($\epsilon = 12514$).

Tetradehydrodeserpidine hydrochloride may be converted into the anhydronium base in the following manner:

Enough of a 50 percent solution of sodium hydroxide in water is added with good agitation to a suspension of 5 parts by weight of the hydrochloride in 10 parts by volume of water and 100 parts by volume of chloroform to liberate the base. The chloroform is then washed with 10 parts by volume of water, dried and distilled in vacuo. The anhydronium base remains as an amorphous powder.

In a similar manner deserpidic acid can be dehydrogenated to tetradehydrodeserpidic acid, as well as esters of deserpidic acid having a free hydroxyl group, for example methyl deserpidate, to the corresponding tetradehydrodeserpidates, such as methyl tetradehydrodeserpidate.

Deserpidine, used as starting material in this example may be obtained as follows:

500 parts by weight of dried, finely ground roots of *Rauwolfia canescens* are extracted batch-wise with methanol at its boiling point, using the following volumes and times, and filtering each extract while hot: 2,000 parts by volume, 1 hour; 1,000 parts by volume, 45 minutes; 1,000 parts by volume, 30 minutes; 1,000 parts by volume, 30 minutes. The extracts are combined and evaporated in vacuo to 75 parts by volume of thick syrupy solution.

After the addition of 75 parts by volume of methanol and 150 parts by volume of acetic acid of 15 percent strength with adequate mixing, the solution is extracted with 2 portions each of 100 parts by volume of hexane. The combined hexane extracts are extracted with 15 parts by volume of acetic acid of 15 percent strength. The latter extract is added to the above acetic acid phase which is then extracted with 3 portions each of 75 parts by volume and 1 portion of 50 parts by volume of ethylene chloride. The first 3 extracts are combined and washed with 60 parts by volume of 2 N sodium carbonate solution and then with 60 parts by volume of distilled water. These washing solutions are saved and used for the washing of the 4th and final ethylene chloride extract. The combined ethylene chloride extracts are dried over sodium sulfate, filtered and evaporated in vacuo to a constant weight of a tan, frothy solid. 1 part by weight of this residue is dissolved in 1.5 parts by volume of warm methanol and the solution cooled to 5° C. for 18 hours, whereby crystallization of a mixture containing principally reserpine sets in.

0.665 part by weight of the above product is dissolved in 8 parts by volume of methylene chloride, treated with 0.05 part by weight of activated charcoal which is then removed by filtration, using 2 parts by volume of methylene chloride as a wash. While the methylene chloride is distilled off it is replaced by 6 parts by volume of methanol. The distillation is continued until the methylene chloride is removed and a volume of approximately 2 parts by volume of methanol remains. After standing over night at −5°, the crystals of impure reserpine are filtered and washed with three portions each of 0.25 part by volume of cold methanol. The mother liquor and wash from the above crystals is evaporated in vacuo to a tan solid residue. 0.85 part by weight of this is dissolved with warming in 2.1 parts by volume of acetone. Needles crystallize from the warm solution. After standing for 2 hours at room temperature, the crystals are filtered, washed with cold acetone, and dried in vacuo at 50° for several hours. 0.236 part by weight of these crystals are dissolved in boiling acetone, the solution concentrated to a volume of 1.7 parts by volume, cooled at room temperature, whereupon crystallization sets in. After standing at room temperature over night, the crystals are filtered, washed with cold acetone, and dried in vacuo at 50° for 5 hours. 0.143 part by weight of these crystals are dissolved in 0.5 part by volume of warm methanol. The crystals dissolve readily and from the solution there crystallize rapidly rosettes of tiny prismatic needles. After standing at room temperature over night, the crystals are filtered and washed with cold methanol. The thus obtained deserpidine melts at 228–232°. It can be converted into deserpidic acid and esters thereof according to the above mentioned copending application Serial No. 471,519, for example as follows:

To 1 part by weight of deserpidine in 20 parts by volume of methanol is added a solution of 2 parts by weight of potassium hydroxide in 10 parts by volume of water. This mixture is refluxed for 2 hours under an atmosphere of nitrogen. At the end of this period all the deserpidine is dissolved and the resulting solution is filtered through glass wool. After cooling, glacial acetic acid (3 parts by volume) is added to give the solution a pH of about 6. The solution is then evaporated in vacuo to a white, solid froth, which is triturated with 25 parts by volume of ether and filtered. The ether insoluble portion is similarly treated with two portions each of 25 parts by volume of ether. The white, ether-insoluble solid is triturated once with 100 parts by volume of acetone and then with 5 portions each of 50 parts by volume of acetone. After each trituration the mixture is filtered and the filtrates evaporated to dryness in vacuo. The white, solid froths thus resulting from the first four triturations are combined and crystallized from methanol, yielding white prisms, melting at 267–269° (dec.). The product is recrystallized by dissolving in a large volume of methanol and methylene chloride, filtering and concentrating until a small volume of methanol remains. After two such recrystallizations deserpidic acid is obtained in the form of white prisms melting at 270–273° (dec.). According to analysis, deserpidic acid has the empirical formula $C_{21}H_{26}O_4N_2$.

To 0.5 part by weight of deserpidine is added a solution of 0.05 part by weight of sodium in 25 parts by volume of methanol. The mixture is refluxed under nitrogen for one hour during which the deserpidine all dissolves. After cooling, the solution is concentrated in vacuo to a volume of about 10 parts by volume. 30 parts by volume of water are added and then concentrated hydrochloric acid in a dropwise manner until the solution is strongly acidic. It is then extracted with 15 parts by volume of ether and re-extracted with 3 portions each of 10 parts by volume of ether. The aqueous phase is then made basic with concentrated aqueous ammonia and extracted with 15 parts by volume of methylene chloride and re-extracted with 3 portions each of 10 parts by volume of methylene chloride. The combined methylene chloride extracts are dried over anhydrous potassium carbonate and concentrated in vacuo to give methyl deserpidate as a pale, yellow solid froth which analyzes for the empirical formula $C_{22}H_{28}O_4N_2$. In the same manner, by employing dry ethanol or butanol instead of methanol, the corresponding alkyl deserpidates are obtained.

What is claimed is:
1. A member of the group consisting of tetradehydrodeserpidic acid, esters thereof wherein the hydrogen atom of the carboxyl group is replaced with a lower alkyl radical and the hydrogen atom of the hydroxyl group is replaced with a member of the group consisting of lower alkanoyl and lower alkoxy-benzoyl radicals, and acid addition salts thereof.
2. The new compound tertadehydrodeserpidine.
3. The acid addition salts of the compound of claim 2.
4. The hydrochloride of the compound of claim 2.
5. The new compound tetradehydrodeserpidic acid.
6. The acid addition salts of the compound of claim 5.
7. A process which comprises treating a compound selected from the group consisting of deserpidic acid, esters thereof wherein the hydrogen atom of the carboxyl group is replaced with a lower alkyl radical and the hydrogen atom of the hydroxyl group is replaced with a member of the group consisting of lower alkanoyl and lower alkoxy-benzoyl radicals, and acid addition salts thereof, with a dehydrogenating agent selected from the group consisting of lead tetraacetate, lead dioxide in the presence of acetic acid, maleic acid in the presence of palladium black, and oxygen in acetic acid in the presence of platinum catalyst, to obtain the corresponding tetradehydro compound.
8. A process which comprises treating deserpidine with lead tetraacetate to obtain tetradehydrodeserpidine.
9. A process which comprises hydrolyzing a member of the group consisting of a di-ester of tetradehydrodeserpidic acid wherein the hydrogen atom of the carboxyl group is replaced with a lower alkyl radical and the hydrogen atom of the hydroxyl group is replaced with a member of the group consisting of lower alkanoyl and lower alkoxy-benzoyl radicals, and acid addition salts thereof under basic conditions to obtain a member of the group consisting of tetradehydrodeserpidic acid, monoesters thereof wherein the hydrogen atom of the carboxyl group is replaced with a lower alkyl radical and acid addition salts thereof.
10. A process which comprises treating a di-ester of tetradehydrodeserpidic acid wherein the hydrogen atom of the carboxyl group is replaced with a lower alkyl radical and the hydrogen atom of the hydroxyl group is replaced with a lower alkoxy-benzoyl radical, with an alkali metal hydroxide to obtain tetradehydrodeserpidic acid.
11. A process which comprises treating tetradehydrodeserpidic acid with a lower diazoalkane to obtain a mono-ester of tetradehydrodeserpidic acid wherein the hydrogen atom of the carboxyl group is replaced with a lower alkyl radical.
12. A process for preparing a di-ester of tetradehydrodeserpidic acid wherein the hydrogen atom of the carboxyl group is replaced with a lower alkyl radical and the hydrogen atom of the hydroxyl group is replaced with a lower alkoxybenzoyl radical, which comprises the step of treating the monoester of tetradehydrodeserpidic acid wherein the hydrogen atom of the carboxyl group is replaced with a lower alkyl radical, with a member of the group consisting of an acid anhydride and an acid chloride of a lower alkoxy-benzoic acid.

References Cited in the file of this patent

Helv. Chim. Acta. (I), v. 33, pages 1463–77 (1950).
Helv. Chim. Acta. (II), v. 37, pages 59–75 (1954).
Angew. Chem., v. 66, Nos. 13 and 14, pages 386–90 (1954).
Organic Chemistry, Whitmore, Van Nostrand Co., N. Y., 2nd ed., 1951, pages 309 and 810.